Patented Jan. 16, 1923.

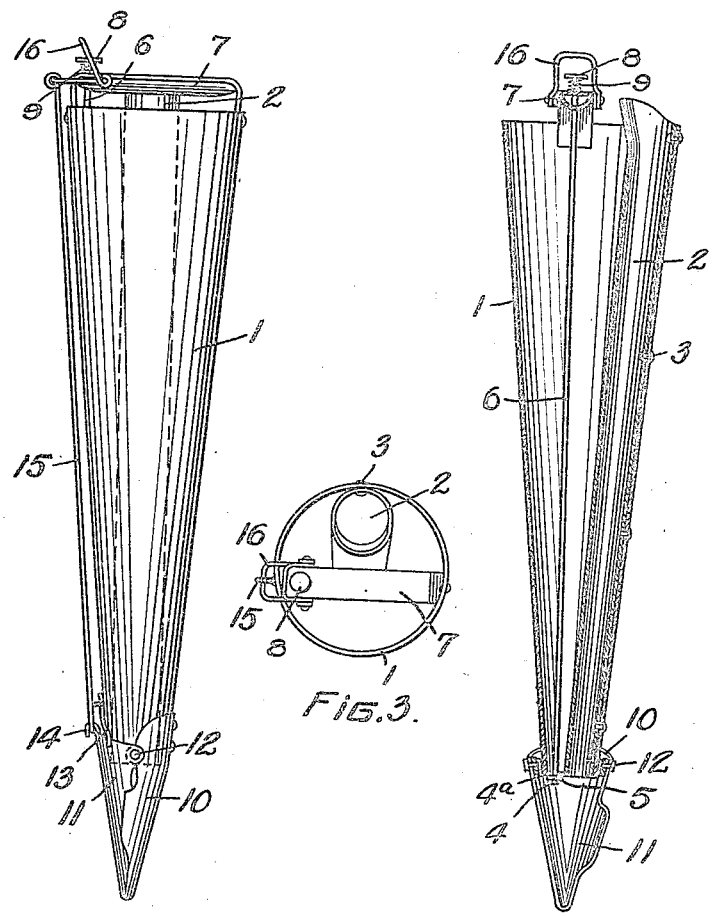

1,442,607

UNITED STATES PATENT OFFICE.

ALFRED DENIS, OF MONTREAL, QUEBEC, CANADA.

TRANSPLANTER.

Application filed July 18, 1921. Serial No. 485,621.

*To all whom it may concern:*

Be it known that I, ALFRED DENIS, a British subject, residing at 2198m St. Denis Street, in the city of Montreal, Province of Quebec, district of Montreal, have invented certain new and useful Improvements in Transplanters; and I do hereby declare that the following is a true, clear, and correct description of the same.

The present invention relates to improvements in transplanters, and its main object will be readily understood from the accompanying description and drawings, in which:

Figure 1 is a side elevation of the invention.

Figure 2 is a vertical sectional view on line A—A of Figure 1.

Figure 3 is a top view of Figure 1.

Like numerals of reference indicate corresponding parts in each figure.

Referring to the drawings, 1 is a conical shaped casing and 2 is a plant-tube located inside said casing 1 and preferably secured to one side thereof. The said plant-tube projects inwardly and parallel to the inner side of said casing 1 and is secured by rivets 3, or it may be made integral with said casing. The tube 2 being much smaller in diameter than the casing, particularly at its lower end, a space will be provided there between the tube and casing, which space is preferably closed by the partition 4, thus providing a relatively large fluid reservoir. The partition 4 is provided with a valve opening 4a, which is controlled by the valve 5, and 6 is a rod or stem connected at its lower end to said valve 5, said stem 6 extending through said casing 1 and the carrying handle 7 which is secured across the open top of said casing. The free end of said stem 6 is provided with a button or head 8, and 9 is a spiral spring wound around said stem 6 and located between said head 8 and said carrying handle 7, thus holding the valve 5 normally closed.

At the lowermost end of the casing 1 is rigidly secured the shovel 10, and 11 is the cooperating movable shovel which is pivotally secured at 12. The two shovels are normally kept in close relation to one another by means of the spring 13 which continually passes down the shovel 11, and 14 is a hook on the upper edge of said shovel 11, to which is secured the rod 15 that projects adjacent the outer side of said casing 1 and is connected at its upper end to the hand operating lever 16 which is movably secured on said carrying handle 7.

The upper edge of the plant-tube 2 is preferably widened in order to facilitate the entrance of the plants therein.

In the operation of the transplanter, it is preferably held by the handle with the hand, and pressed into the soil, so that the shovels will make a hole. The lever 16 is then operated to open the shovels and the button 8 is pressed to spray the hole with water. The plant is dropped into the transplanter 2, which is so centered in relation to the shovels that the plant will fall right in the deepest part of the hole. The transplanter is then removed and the soil is brought back to properly cover the plant.

What I claim as my invention is:

A transplanter comprising a conical water-containing casing; a tubular chute to receive a plant to be transplanted, disposed entirely within said casing and secured along its entire length to the casing; a partition in the lower end of the casing and through which the discharge end of the chute opens; a valve carried by said partition to control the discharge of the water; a carrying handle arranged at the larger end of the conical casing; an actuating rod for said valve extending upwardly through said handle and having a spring seated on said handle for keeping the valve normally closed; a shovel rigidly secured to the smaller end of said casing immediately below the discharge end of the plant chute; a cooperating shovel pivotally secured to the casing; and means for actuating said pivoted shovel including an actuating rod operated from said handle.

Signed at Montreal, Quebec, Canada, this 29th day of June, 1921.

ALFRED DENIS.

Witnesses:
C. PATENAUDE,
G. BEAUDOIN.